United States Patent [19]

Kobe et al.

[11] Patent Number: 4,933,234

[45] Date of Patent: Jun. 12, 1990

[54] PRIMED POLYMERIC SURFACES FOR CYANOACRYLATE ADHESIVES

[75] Inventors: James J. Kobe, Maplewood; John T. Simpson, Lake Elmo, both of Minn.; Kimberly K. Harmon, Hudson, Wis.; Charles D. Wright, Birchwood, Minn.

[73] Assignee: Minnesota Mining and Manufacturing Company, St. Paul, Minn.

[21] Appl. No.: 85,085

[22] Filed: Aug. 13, 1987

[51] Int. Cl.$^5$ .................. B32B 27/36; B32B 27/38; C09J 3/14
[52] U.S. Cl. .................. 428/336; 428/412; 428/414; 428/419; 428/421; 428/474.7; 428/516; 428/518; 428/519; 428/520; 156/331.8
[58] Field of Search ............... 428/336, 412, 414, 419, 428/421, 474.7, 516–520, 353

[56] References Cited

U.S. PATENT DOCUMENTS

| | | | |
|---|---|---|---|
| 2,768,109 | 10/1956 | Coover | 154/133 |
| 2,784,127 | 3/1967 | Jaynor | 184/43 |
| 3,252,880 | 5/1966 | Magat et al. | 204/154 |
| 3,259,534 | 7/1966 | Wicker et al. | 156/315 |
| 3,260,637 | 7/1966 | Bramer et al. | 156/314 |
| 3,628,987 | 12/1971 | Nakata et al. | 117/47 A |
| 3,948,794 | 4/1976 | König | 252/182 |
| 4,041,192 | 8/1977 | Heger et al. | 427/43 |
| 4,125,494 | 11/1978 | Schoenberg et al. | 260/17 A |
| 4,139,693 | 2/1979 | Schoenberg | 526/297 |
| 4,148,839 | 4/1979 | Fydelor | 260/857 |
| 4,170,585 | 10/1979 | Motegi et al. | 260/33.2 R |
| 4,179,401 | 12/1979 | Garnett et al. | 252/429 |
| 4,200,549 | 4/1980 | Okamura et al. | 252/182 |
| 4,215,173 | 7/1980 | Hubbard | 428/331 |
| 4,307,216 | 12/1981 | Shiraishi et al. | 526/298 |
| 4,377,490 | 3/1983 | Shiraishi et al. | 252/188.3 R |
| 4,425,471 | 1/1984 | Millet | 526/298 |
| 4,450,265 | 5/1984 | Harris | 526/298 |
| 4,511,686 | 4/1985 | Millet | 524/110 |
| 4,563,388 | 1/1986 | Bonk et al. | 428/304.4 |
| 4,698,247 | 10/1987 | Murray et al. | 428/353 |

FOREIGN PATENT DOCUMENTS 0129069  12/1984  European Pat. Off. .

OTHER PUBLICATIONS

Surface Treatments for Polyolefins, *Surface Analysis & Pretreatment of Plastics & Metals,* D. M. Brewis, Ed, (1982) pp. 199–226.
Surface Modification of Polyethylene by Radiation-Induced Grafting for Adhesive Bonding I. Relationship Between Adhesive *Bond Strength & Surface Composition,* (S. Yamakawa, J. Appl Polym. Sci., 20, 3057–3072 (1976).
II. Relationship Between Adhesive Bond Strength & Surface Structure, (S. Yamakawa et al.), Macromolecules 9, 754–758, 1976).
III. Oxidative Degradation & Stabilization of Grafted Layer, (S. Yamakawa et al., J. Appl. Polym. Sci., 22, 2459–2470, 1978).
IV. Improvement in Wet Peel Strength, (S. Yamakawa et al., J. Appl. Polym. Sci., 25, 25–39, 1980).
V. Comparison With Other Surface Treatments (S. Yamakwa et al., J. Appl. Polym. Sci., 25, 40–49, 1980).

*Primary Examiner*—P. C. Ives
*Attorney, Agent, or Firm*—D. M. Sell; W. N. Kirn; C. Truesdale

[57] ABSTRACT

A primed polymeric article is provided. The article comprises a polymeric substrate having graft polymerized thereon at least one organic nucleophilic graft-polymerizable monomer or salt thereof which is capable of accelerating the cure of a cyanoacrylate adhesive. The invention also provides an article wherein the primed polymeric article is adhered to a substrate with a cyanoacrylate adhesive and a method for adhering a polymeric first substrate to a second substrate with a cyanoacrylate adhesive.

15 Claims, No Drawings

PRIMED POLYMERIC SURFACES FOR CYANOACRYLATE ADHESIVES

FIELD OF THE INVENTION

This invention relates to polymeric substrates having a primed surface which provides improved bonding of cyanoacrylate adhesives thereto and a method for adhering primed polymeric substrates with cyanoacrylate adhesives.

BACKGROUND OF THE INVENTION

Adhesive compositions based on alpha-cyanoacrylate esters belong to a class of adhesives known as reactive liquid adhesives. These cyanoacrylate adhesives are single-part, low viscosity adhesives which polymerize rapidly at room temperature without the use of an added catalyst when pressed between two substrates. Application of the cyanoacrylate adhesives merely involves spreading a small amount of the adhesive between two substrates, pressing the substrates together, and allowing the resultant bond to cure. The adhesive develops sufficient strength after a short period of time to hold the substrates together until the adhesive completely polymerizes and builds up to its maximum bonding strength.

Initiation of polymerization, or cure, is generally believed to proceed through an anionic mechanism. The cyanoacrylate adhesives have such a great tendency to polymerize that water is a sufficiently active initiator. When the adhesive is applied to a substrate and exposed to atmospheric and surface moisture, polymerization usually begins within a relatively short period of time, generally less than one minute, and on many surfaces within a matter of a few seconds.

For many years a need has existed for improved bonding of polymeric substrates to other materials, e.g., metals, wood and ceramics, or to themselves with cyanoacrylate adhesives. Untreated polymeric substrates, particularly polyolefin and polyfluorocarbon substrates, when bonded with cyanoacrylate adhesives, generally exhibit less shear strength than is desired for many end uses.

Modification of polymeric surfaces has been used as a means of increasing the adhesion of various adhesives to polymeric surfaces. Surface modification techniques which have been examined are corona discharge treatment, flame treatment with, for example, helium gas plasma or oxygen gas plasma, and chemical treatment with, for example, chromic acid, potassium permanganate, or peroxydisulphate solutions. Such treatments are described by D. Briggs in "Surface Treatments for Polyolefins," *Surface Analysis and Pretreatment of Plastics and Metals*, D. M. Brewis, Ed., MacMillan, New York, 1982 pp. 199–226. These treatments and other surface modification procedures have a common shortcoming in poor durability. Light rubbing of the surface causes a decrease in the effect, the altered surface being easily abraded.

Irradiation of polyolefin substrates, such as with an electron beam, to improve the adhesion of various coatings is also known and has been disclose, for example, in U.S. Pat. No. 4,041,192 (Heger et al.), No. 4,148,839 (Fydelor), No. 3,252,880 (Magat et al.) and No. 4,179,401 (Garnett et al.).

Application of a precoat, or primer, on surfaces of various materials has also been used to improve the adhesion of cyanoacrylate adhesives to various substrates. Primers which have been used include alkyl monohydric alcohols (U.S. Pat. No. 2,768,109, Coover, Jr.), monomeric epoxides (U.S. Pat. No. 3,259,534, Wicker, Jr. et al.), organic amines such as secondary amines, tertiary amines, N-substituted alkanolamines, acrylated N-substituted alkanolamines, diamines and certain heterocyclic amines (U.S. Pat. No. 3,260,637, Von Bramer), organometallic compounds (European Patent Publication No. 0 129 069, Toagosei), a solid mixture of alkaline or basic accelerator, such as sodium or potassium hydroxide or sodium borosilicate spheres of micro-size, combined in a chalkable calareous binder (U.S. Pat. No. 4,215,173, Hubbard), alkyl 2-cyanopenta-2,4-dienoate (U.S. Pat. No. 4,425,471, Millet), and tannins, such as digallic acid, tannic acid, or other hydrolyzable or condensed tannin (U.S. Pat. No. 4,511,686, Millet). However, many of these priming materials are easily removed from the substrate to which they are applied by evaporation or abrasion during handling of the primed substrate.

Improved adhesion of cyanoacrylate adhesives to various substrates through the use of adhesive additives has also been described. Various additives which have been suggested include plasticizers, such as alkyl esters of aliphatic monocarboxylic acids, alkyl esters of aliphatic dicarboxylic acids, alkyl phosphates, triaromatic phosphates, polyfunctional aliphatic esters, and aliphatic and aromatic phosphonates (U.S. Pat. No. 2,784,127, Joyner et al.), itaconic acid anhydride (U.S. Pat. No. 3,948,794, Eberhard), acetic acid (U.S. Pat. No. 4,125,494, Schoenberg et al.), compounds having the formula

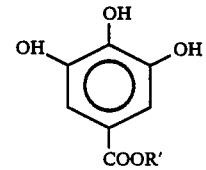

wherein R' is hydrogen or an alkyl, aryl, or cycloalkyl group having 1 to 10 carbon atoms, such as gallic acid monohydrate, methyl gallate, propyl gallate and hexyl gallate (U.S. Pat. No. 4,139,693, Schoenberg), a combination of polyethylene glycols having a degree of polymerization of at least 3 and non-ionic surface active agents having a poly(ethyleneoxy) moiety therein with the poly(ethyleneoxy) moiety having a degree of polymerization of at least 3 (U.S. Pat. No. 4,170,585, Motegi et al.), trichlortrifluoroethane (U.S. Pat. No. 4,200,549, Okamura et al.), esters compounds such as acrylates, methacrylates, and crotonates of glycols, glycol monoethers, and monoesters (U.S. Pat. No. 4,307,216, Shiraishi et al.), a combination of (1) at least one aliphatic polyol and/or polyether and derivatives thereof and (2) at least one aromatic polyol and/or carboxylic acid and derivatives thereof (U.S. Pat. No. 4,377,490, Shiraishi et al.), and phthalic anhydride (U.S. Patent No 4,450,265, Harris).

Polyolefin substrates have been provided with a treated surface for improved adhesion of pressure-sensitive adhesives. U.S. Pat. No. 3,628,987 (Nakata et al.) discloses a pressure-sensitive adhesive film wherein the film surface to which the adhesive is adhered has graft-polymerized thereto a vinyl monomer or diene monomer, the adhesive having a solubility parameter near that of polymers of the vinyl or diene monomer. U.S. Pat. No. 4,563,388 (Bonk et al.) discloses a polyolefin substrate having graft-polymerized thereto at least one monomer selected from the group consisting of acrylic acid, methacrylic acid and ester thereof; acrylamide; methacrylamide; sterically non-hindered tertiary alkyl acrylamides and methacrylamides having three or less carbon atoms in the alkyl group; and N-vinyl pyrrolidone, and firmly adherently bonded to the graft-polymerized monomer, an acrylic-type, normally tacky and pressure-sensitive adhesive.

A series of articles, "Surface Modification of Polyethylene by Radiation-Induced Grafting for Adhesive Bonding. I. Relationship Between Adhesive Bond Strength and Surface Composition," (S. Yamakawa, *J. Appl. Polym. Sci.*, 20, 3057–3072 (1976); "II. Relationship Between Adhesive Bond Strength and Surface Structure," (S. Yamakawa et al., *Macromolecules*, 9, 754–758, 1976); "III. Oxidative Degradation and Stabilization of Grafted Layer," (S. Yamakawa et al., *J. Appl. Polym. Sci.*, 22, 2459–2470, 1978); "IV. Improvement in Wet Peel Strength," (S. Yamakawa et al., *J. Appl. Polym. Sci.*, 25, 25–39, 1980), and "V. Comparison with Other Surface Treatments, " (S. Yamakawa et al., *J. Appl. Polym. Sci.*, 25, 40–49, 1980), disclose grafting of methyl acrylate (followed by saponification), vinyl acetate, acrylic acid, acrylamide, and methylolacrylamide to polyethylene by vapor-phase mutual grafting or liquid-phase preirradiation at thicknesses of grafted monomer of more than 10 micrometers to improve adhesion of epoxy adhesives.

SUMMARY OF THE INVENTION

The present invention provides a primed polymeric article comprising a polymeric substrate having graft-polymerized thereon at least one organic nucleophilic graft-polymerizable monomer or salt thereof which is capable of accelerating the cure of a cyanoacrylate adhesive.

The present invention further provides a primed polymeric first substrate firmly adhered to a second substrate with a cyanoacrylate adhesive, the polymeric first substrate having graft-polymerized thereto at least one organic nucleophilic graft-polymerizable monomer or salt thereof which is capable of accelerating the cure of the cyanoacrylate adhesive.

The present invention also provides a method for adhering a polymeric first substrate to a second substrate with a cyanoacrylate adhesive comprising the steps of
  (a) coating that portion of the polymeric first substrate to be adhered with at least one organic nucleophilic graft-polymerizable monomer or salt thereof which is capable of accelerating the cure of the cyanoacrylate adhesive;
  (b) irradiating the coated substrate to graft polymerize said monomer to said substrate;
  (c) coating a cyanoacrylate adhesive on at least one of
    (i) the graft-polymerized monomer surface of the first substrate and (ii) a surface of the second substrate to be adhered;
  (d) contacting said surfaces (i) and (ii); and
  (e) allowing the cyanoacrylate adhesive to cure.

The graft-polymerized monomeric layer provides an increase in the bond strength of the cyanoacrylate adhesive to the polymeric substrate. Where the second substrate is also a polymeric material, that substrate preferably has at least one of the organic nucleophilic monomers or salts thereof graft-polymerized thereto.

DETAILED DESCRIPTION OF THE INVENTION

The substrate of the invention is polymeric material. Polymeric materials include polyolefins, such as polyethylene, polypropylene, and blends thereof; polyesters, such as polyethylene terephthalate and polybutylene terephthalate; polyamides, such as nylon; polyimides, such as Kaptan ™; acetals, such as Delrin ™; polycarbonates; polyvinyl chloride; polysulfones; polystyrene; polyacrylonitrile; polyacrylates; and polyfluorocarbons, such as polytetrafluoroethylene. Such material can be formed by well-known methods such as extruding, casting, blowing, and molding.

These formed polymeric materials are variously useful, for example, as films, fibers, foams, sheeting, tubing and piping, automotive parts, appliance parts, glazing materials, and furniture components, and in laminates and structural applications. The particular type of polymeric material is determined by the end use of the article formed from the material.

The polymeric material may contain additives, such as colorants, fillers, crosslinking agents, dispersants, plasticizers, and extrusion aids, which are known in the art.

The monomers which are graft-polymerized onto the polymeric substrate are those monomers which are organic nucleophilic graft-polymerizable monomers or salts thereof which are capable of accelerating the cure of the cyanoacrylate adhesive. Such monomers include secondary amines, tertiary amines, alkanol amines, di-n-alkylamides, and epoxides which have a polymerizable substituent such as, for example, a vinyl or acrylate group. Substituted amines useful as the monomers in the present invention include substituted piperidines, substituted pyrrolidenes, substituted pyridines, substituted azoles, e.g. imidazoles and pyrazoles, substituted oxazines, substituted diazines, e.g., pyridazines, pyrimidines, and pyrazines, substituted purines, and dialkylaminoalkyl acrylates and methacrylates represented by the formula $R^1R^2NR^3OCOCH\!=\!CH_2$ where $R^1$ and $R^2$ are independently lower alkyl groups preferably having 1 to 6 carbon atoms and $R^3$ is a lower alkyl group preferably having 1 to 8 carbon atoms.

Specific monomers useful in the present invention include 4-vinyl pyridine, 2-vinyl pyridine, 1-vinyl imidazole, 1,3-dimethyl-7-vinyl xanthine, 3-methyl-7-vinyl xanthine, glycidyl acrylate, glycidyl methacrylate, dimethyl acrylamide, diethylaminoethyl acrylate, dimethylaminopropyl methacrylate, dimethylaminoneopentyl acrylate, dimethylaminoethyl methacrylate, 2-(N-piperidino)ethyl acrylate, 2-(N-pyrrolidino)ethyl acrylate, and 5-vinyl pyrimidine.

The monomer composition applied to the polymeric substrate may contain various additives such as solvents, crosslinking agents, and surfactants. The monomer composition should be free of acidic contaminants which tend to inhibit polymerization of cyanoacrylate adhesives.

Crosslinking agents, some of which may also be monomers suitable for grafting onto the substrate themselves, may be added to further enhance heat resistance of the product. Examples of useful crosslinking agents include polyethylene glycol diacrylate, pentaerythritol tetraacrylate, tetraethylene glycol dimethacrylate, trimethylolpropane triacrylate, trimethylolpropane trimethacrylate, allyl methacrylate, 1,6-hexanediol diacrylate, 1,6-hexanediol dimethacrylate thiodiethylene glycol diaorylate, triallyl cyanurate, and ethoxylated trimethylol propane methyl ether diacrylate. The preferred crosslinking agents include polyethylene glycol diacrylate, tetraethylene glycol dimethacrylate trimethylol propane tricrylate, and thiodiethylene glycol diacrylate. Crosslinking agents may be present in monomer compositions in amounts of about 0 to 80 weight percent, preferably about 0 to 40 weight percent.

Surfactants may be present in the monomer composition to improve the uniformity of the coating on the substrate.

The thickness of the monomer composition is preferably less than about 5 micrometers, more preferably less than about 1 micrometer and most preferably less than about 0.5 micrometer. Generally, the thickness of the monomer layer is at least about 0.05 micrometers.

The monomer may be graft-polymerized to the substrate by use of actinic radiation such as X-rays, beta rays, gamma rays, ultraviolet and visible light from conventional mercury sources or lasers, and electron beam irradiation. The preferred methods of graft-polymerization are by irradiation with an electron beam or ultraviolet radiation. The electron beam dosage is typically greater than about 0.05 Mrads, preferably greater than about 0.5 Mrads, and more preferably in the range of 2 to about 10 Mrads. The ultraviolet radiation dosage, both with conventional mercury sources or laser, is typically greater than about 100 mjoules/cm$^2$, preferably greater than about 300 mjoules/cm$^2$, and generally less than about 700 mjoules/cm$^2$.

The cyanoacrylate adhesives useful in the present invention are esters of α-cyanoacrylic acid. These esters may be alkyl, alkenyl, haloalkyl, alkoxyalkyl, bis-cyanoacrylates, or β-substituted-α-cyanoacrylates. The preferred esters are represented by the formula

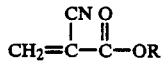

where R is an alkyl or alkenyl group having form 1 to 16 carbon atoms, a cyclohexyl group, or a phenyl group. Commercially important esters include the methyl, ethyl, isopropyl, n-butyl, and allyl esters, the methyl and ethyl esters being the most commonly used. Commercially available cyanoacrylate adhesives include Scotchweld TM CA-8, available from 3M Company, Superbonder TM 414, available from Loctite Corp., Permabond TM 102, available from Permabond International Div., National Starch and Chemical Corp., Pacer Tech TM E-100, available from Pacer Technology and Resources, and TB 1743, available from Three Bond Corp. of America.

The advantages of the invention are illustrated by the following examples, it being understood that numerous variations will be well within the ability of those skilled in the art. In the examples, all parts and percentages are by weight unless otherwise indicated.

In the Examples, the following test was used to evaluate the shear strength of the cyanoacrylate adhesive bonds.

SHEAR TEST

Two test panels (2.54 cm x 5.08 cm x .32 cm) are adhered by placing a large drop, about 0.2 grams, of Scotchweld TM CA-8 adhesive, an ethyl cyanoacrylate adhesive, available from 3M Company, on each test panel to coat a 2.54 cm x 1.27 cm end portion of each panel and the adhesive-coated surfaces are brought into contact with each other to form a 2.54cm x 1.27 cm overlap. The test panels are clamped at each edge of the of the overlap using 0.94 cm capacity binder clips No. 10020 available from IDL Mfg. and Sales Corp., Carlstadt, N.J. The adhesive is allowed to cure at room temperature and the force to break the bond is measured using tensile testing equipment at a jaw separation rate of 2.54 mm/min.

EXAMPLE 1

To polypropylene panels (2.54 cm x 5.08 cm x 0.32 cm) was applied a blend of 100 parts 2-vinyl pyridine and 0.5 part of a fluorochemical acrylate oligomer (a wetting and leveling agent commercially available from 3M Company as FC-430 TM). The coating thickness was about one micrometer. Each coated surface was then exposed to electron beam irradiation at a dosage of about 4 Mrads and a voltage of 150–250 kV in a nitrogen atmosphere to effect graft-polymerization of the 2-vinyl pyridine onto the surface of the polypropylene panels.

The polypropylene panels having the 2-vinyl pyridine graft polymerized thereon were surface cleaned with acetone to remove any ungrafted monomer and hompolymer of the monomer and two of the panels were adhered together at their graft-polymerized surfaces, allowed to cure for 44 hours and tested for shear strength. The shear strength was 2810 kPa.

EXAMPLES 2–5 AND COMPARATIVE EXAMPLE C1

In Examples 2–5, polypropylene test panels were prepared as in Example 1, except the various monomers set forth in Table 1 were used in place of the 2-vinyl pyridine. The panels were adhered together at their draft-polymerized surfaces using Scotchweld TM CA-8 cyanoacrylate adhesive, allowed to cure for 20 hours (Examples 2–4) or 44 hours (Example 5) and tested for shear strength. In Comparative Example C1, test panels having no monomer graft polymerized thereon were adhered together in the same manner as in Examples 2–5, allowed to cure for 20 hours, and tested for shear strength. The results are set forth in Table 1.

TABLE 1

| Example | Monomer | Shear strength (kPa) |
| --- | --- | --- |
| 2 | 1-vinyl imidazole | 4440* |
| 3 | dimethylaminoneopental acrylate | 5830* |
| 4 | dimethylaminoethyl methacrylate | 4720* |
| 5 | dimethylaminoethyl acrylate | 3980* |
| C1 | none | 0** |

*substrate failure
**adhesive failure when mounting for testing

EXAMPLES 6–10 AND COMPARATIVE EXAMPLE C2

Test panels were prepared as in Example 1, except that the panels were polyethylene and the various monomers set forth in Table 2 were graft polymerized onto the surface of the test panels. The panels were adhered together at their graft-polymerized surfaces, allowed to cure for 20 hours (Examples 6 and 7) or 44 hours (Examples 8–10), and tested for shear strength. In Comparative Example C2, test panels having no monomer graft polymerized thereon were adhered together in the same manner as in Examples 6–10, allowed to cure for 20 hours, and tested for shear strength. The results are set forth in Table 2.

TABLE 2

| Example | Monomer | Shear strength (kPa) |
|---|---|---|
| 6 | dimethylaminoneopental acrylate | 5180 |
| 7 | dimethylaminoethyl methacrylate | 4760* |
| 8 | dimethylaminoethyl acrylate | 6140* |
| 9 | 1-vinyl imidazole | 6510* |
| 10 | 2-vinyl pyridine | 5230 |
| C2 | none | 0** |

*substrate failure
**adhesive failure when mounting for testing

EXAMPLE 11

Polypropylene test panels were prepared as in Example 1, except that the panels having the 2-vinyl pyridine graft polymerized thereon were stored for 25 days before application of adhesive and testing for shear strength. The shear strength was 3310 kPa, a value similar to that of the panels of Example 1.

EXAMPLES 12–15 AND COMPARATIVE EXAMPLE C1

In Examples 12–15, test panels were prepared as in Example 1, except that the panels were polytetrafluoroethylene and the various monomers set forth in Table 3 were graft polymerized onto the surface of the test panels. The panels were adhered together at their graft-polymerized surfaces with cyanoacrylate adhesive, allowed to cure for 16 hours, and tested for shear strength. In Comparative Example C3, polytetrafluoroethylene test panels which had no monomer graft polymerized thereon were adhered together with cyanoacrylate adhesive and tested for shear strength. The results are set forth in Table 3.

TABLE 3

| Example | Monomer | Shear strength (kPa) |
|---|---|---|
| 12 | 4-vinyl pyridine | 2470 |
| 13 | 1-vinyl imidazole | 2730* |
| 14 | dimethylaminoethyl acrylate | 2540 |
| 15 | glycidyl methacrylate | 1530 |
| C3 | none | 800 |

*substrate failure

EXAMPLES 16–19 AND COMPARATIVE EXAMPLE C4

In Examples 16–19, test panels were prepared as in Example 1, except that the panels were Delrin TM, a linear polyoxymethylene-type acetal resin, available from E. I. du Pont de Nemours co., and the various monomers set forth in Table 4 were graft polymerized onto the surface of the test panels. The panels were adhered together at their graft-polymerized surfaces with cyanoacrylate adhesive, allowed to cure for 16 hours, and tested for shear strength. In Comparative Example C4, Delrin TM test panels which had no monomer graft polymerized thereon were adhered together with cyanoacrylate adhesive and tested for shear strength. The results are set forth in Table 4.

TABLE 4

| Example | Monomer | Shear strength (kPa) |
|---|---|---|
| 16 | 4-vinyl pyridine | 4120* |
| 17 | 1-vinyl imidazole | 4910* |
| 18 | dimethylaminoethyl acrylate | 5430* |
| 19 | glycidyl methacrylate | 4880 |
| C4 | none | 1420 |

*substrate failure

EXAMPLE 20–23 AND COMPARATIVE EXAMPLE C5

In Examples 20–23, test panels were prepared as in Example 1, except that the various monomers set forth in Table 5 were graft polymerized onto the surface of the test panels. The panels were adhered together at their graft-polymerized surfaces with cyanoacrylate adhesive, allowed to cure for 16 hours, and tested for shear strength. In Comparative Example C5, polypropylene test panels which had no monomer graft polymerized thereon were adhered together with cyanoacrylate adhesive and tested for shear strength. The results are set forth in Table 5.

TABLE 5

| Example | Monomer | Shear strength (kPa) |
|---|---|---|
| 20 | 4-vinyl pyridine | 2230* |
| 21 | 1-vinyl imidazole | 2260* |
| 22 | dimethylaminoethyl acrylate | 2360* |
| 23 | glycidyl methacrylate | 1300 |
| C5 | none | 390 |

*substrate failure

EXAMPLES 24–27 AND COMPARATIVE EXAMPLE C6

In Examples 24–29, test panels were prepared as in Example 1, except that the panels were polyethylene and the various monomers set forth in Table 6 were graft polymerized onto the surface of the test panels. The panels were adhered together at their graft-polymerized surfaces with cyanoacrylate adhesive, allowed to cure for 16 hours, and tested for shear strength. In Comparative Example C6, polyethylene test panels which had no monomer graft polymerized thereon were adhered together with cyanoacrylate adhesive and tested for shear strength. The results are set forth in Table 6.

TABLE 6

| Example | Monomer | Shear strength (kPa) |
|---|---|---|
| 24 | 4-vinyl pyridine | 2740* |
| 25 | 1-vinyl imidazole | 4560* |
| 26 | dimethylaminoethyl acrylate | 3720* |
| 27 | glycidyl methacrylate | 2230 |
| C6 | none | 510 |

*substrate failure

EXAMPLES 28–31 AND COMPARATIVE EXAMPLE C7

In Examples 28–31, test panels were prepared as in Example 1, except that the various monomers set forth in Table 7 were graft polymerized onto the surface of the test panels. The panels were adhered together at their graft-polymerized surfaces with cyanoacrylate adhesive, allowed to cure for 24 hours, and tested for shear strength. In Comparative Example C7, polypropylene test panels which had no monomer graft polymerized thereon were adhered together with dyanoacrylate adhesive and tested for shear strength. The results are set forth in Table 7.

TABLE 7

| Example | Monomer | Shear strength (kPa) |
| --- | --- | --- |
| 28 | dimethylacrylamide | 940 |
| 29 | diethylacrylamide | 300 |
| 30 | di-n-butylacrylamide | 480 |
| 31 | di-n-hexylacrylamide | 470 |
| C7 | none | 0* |

*adhesive failure when mounting for testing

The various modifications and alterations of this invention will be apparent to those skilled in the art without departing from the scope and spirit of this invention and this invention should no be restricted to that set forth herein for illustrative purposes.

We claim:

1. A primed polymeric article comprising a polymeric substrate having graft polymerized thereon at least one organic nucleophilic graft-polymerizable monomer or salt thereof which monomer of salt thereof is capable of accelerating the cure of a cyanoacrylate adhesive.

2. The article of claim 1 wherein said polymeric substrate is polyolefin, polyester, polyamide, acetal, polycarbonate, polyvinyl chloride, polysulfone, polystyrene, polyacrylonitrile, polyacrylate, or polyfluorocarbon.

3. The article of claim 1 wherein said monomer is a secondary or tertiary amine, alkanolamine, substituted amine; di-n-alkylamide or epoxide which has a polymerizable substituent.

4. The article of claim 3 wherein the substituted amines are substituted piperidines, substituted pyrrolidenes, substituted pyridines, substituted azoles, substituted oxazines, substituted diazines, substituted purines, and dialkylaminoalkyl acrylates and methacrylates represented by the formula $R^1R^2NR_3OCOCH=CH_2$ where $R^1$, $R^2$, and $R^3$ are lower alkyl groups.

5. The article of claim 1 wherein said monomer is 4-vinyl pyridine, 1-vinyl imidazole, 1,3-dimethyl-7-vinyl xanthine, 3-methyl-7-vinyl xanthine, glycidyl acrylate, dimethyl acrylamide, diethylaminoethyl acrylate, dimethylaminopropyl methacrylate, 2-(N-piperidino)ethyl acrylate, 2-(N-pyrrolidino)ethyl acrylate and 5-vinyl pyrimidine.

6. The article of claim 1 wherein said monomer is free of acidic contaminants.

7. The article of claim 1 wherein said graft-polymerized monomer forms a layer less than about 5 micrometers thick.

8. An article comprising a primed polymeric first substrate firmly adhered to a second substrate with a cyanoacrylate adhesive, said polymeric first substrate having, graft-polymerized thereto at least one organic nucleophilic graft-polymerizable monomer or salt thereof which is capable of accelerating the cure of said cyanoacrylate adhesive.

9. The article of claim 8 wherein said polymeric substrate is polyolefin, polyester, polyamide, acetal, polycarbonate, polyvinyl chloride, polysulfone, polystyrene, polyacrylonitrile, polyacrylate, or polyfluorocarbon.

10. The article of claim 8 wherein said monomer is a secondary or tertiary amine, alkanolamine, substituted amine, di-n-alkylamide, or epoxide which has a polymerizable substituent.

11. The article of claim 10 wherein the substituted amines are substituted piperidines, substituted pyrrolidenes, substituted pyridines, substituted azoles, substituted oxazines, substituted diazines, substituted purines, and dialkylaminoalkyl acrylates and methacrylates represented by the formula $R^1R^2NR_3OCOCH=CH_2$ where $R^1$, $R^2$, and $R^3$ are lower alkyl groups.

12. The article of claim 8 wherein said monomer is 4-vinyl pyridine, 1-vinyl imidazole, 1,3-dimethyl-7-vinyl xanthine, 3-methyl-7-vinyl xanthine, glycidyl acrylate, dimethyl acrylamide, diethylaminoethyl acrylate, dimethylaminopropyl methacrylate, 2-(N-piperidino)ethyl acrylate, 2-(N-pyrrolidino)ethyl acrylate and 5-vinyl pyrimidine.

13. The article of claim 8 wherein said monomer is free of acidic contaminants.

14. The article of claim 8 wherein said graft-polymerized monomer forms a layer less than about 5 micrometers thick.

15. The article of claim 8 wherein said second substrate is a polymeric substrate having graft-polymerized thereon at least one organic nucleophilic graft-polymerizable monomer or salt thereof which is capable of accelerating the cure of a cyanoacrylate adhesive.

* * * * *

UNITED STATES PATENT AND TRADEMARK OFFICE
CERTIFICATE OF CORRECTION

PATENT NO. : 4,933,234

DATED : June 12, 1990

INVENTOR(S) : James J. Kobe, John T. Simpson, Kimberly K. Harmon, Charles D. Wright It is certified that error appears in the above-identified patent and that said Letters Patent is hereby corrected as shown below:

Col. 2, line 12     "calareous" should read "calcareous"

Col. 5, line 3     "diaorylate" should read "diacrylate"

Col. 5, line 42     "form" should read "from"

Col. 6, line 4-5     "edge of the of the overlap." should read "edge of the overlap."

Col. 7, line 59     the "c" in co. should be capitalized

Col. 9, line 6-7     "dyanoacrylate" should read "cyanoacrylate"

Col. 9, line 39     after "amine", change the ";" to a ","

Signed and Sealed this

Seventeenth Day of September, 1991

Attest:

HARRY F. MANBECK, JR.

Attesting Officer     Commissioner of Patents and Trademarks